[19] United States Patent
Yoshida et al.

[11] Patent Number: 5,202,612
[45] Date of Patent: Apr. 13, 1993

[54] CONCRETE VIBRATOR

[75] Inventors: Kenji Yoshida, Tokyo; Akinobu Shionoya, Musashino; Kazuo Matsushita, Ohmiya; Isao Baba, Chino, all of Japan

[73] Assignees: Sinano Electric Co., Ltd.; Mikasa Sangyo Kabushiki Kaisha, both of Tokyo, Japan

[21] Appl. No.: 802,693

[22] Filed: Dec. 3, 1991

Related U.S. Application Data

[63] Continuation of Ser. No. 524,676, May 16, 1990, abandoned, which is a continuation of Ser. No. 299,269, Jan. 23, 1989, abandoned.

[30] Foreign Application Priority Data

Jan. 29, 1988 [JP] Japan ................................. 63-17112

[51] Int. Cl.$^5$ ............................................. H02P 6/02
[52] U.S. Cl. ..................................... 318/138; 366/108; 366/116
[58] Field of Search ............... 366/108, 120, 121, 122, 366/123, 116, 118, 128; 318/138, 254, 439

[56] References Cited

U.S. PATENT DOCUMENTS

| 4,254,435 | 2/1981 | Alley et al. | 318/138 |
| 4,495,450 | 1/1985 | Tokizaki et al. | 318/138 |
| 4,520,296 | 5/1985 | Lepper et al. | 318/138 |
| 4,641,066 | 3/1987 | Nagata et al. | 318/254 |
| 4,651,067 | 3/1987 | Ito et al. | 318/138 |
| 4,743,815 | 5/1988 | Gee et al. | 318/138 |

FOREIGN PATENT DOCUMENTS 62-189992 8/1987 Japan.
62-189993 8/1987 Japan.

Primary Examiner—William M. Shoop, Jr.
Assistant Examiner—John W. Cabeca
Attorney, Agent, or Firm—Emmanuel J. Lobato; Robert E. Burns

[57] ABSTRACT

A concrete vibrator is disclosed in which a sensorless semiconductor motor is employed for driving an exciter. The sensorless semiconductor motor has an arrangement in which the rotational position of the permanent magnet rotor is sensed through utilization of a voltage which is induced from three-phase stator windings, i.e. a voltage which is induced according to the magnetic flux distribution in the gap and varies its frequency with the rotation speed alone instead of by using the Hall element which is readily damaged by vibration and heat, that is, seriously poor in environmental resistance. Further, the sensorless semiconductor motor is arranged so that the current supply to the stator winding is placed under control of a semiconductor inverter which is controlled by a PWM or PAM system.

5 Claims, 3 Drawing Sheets

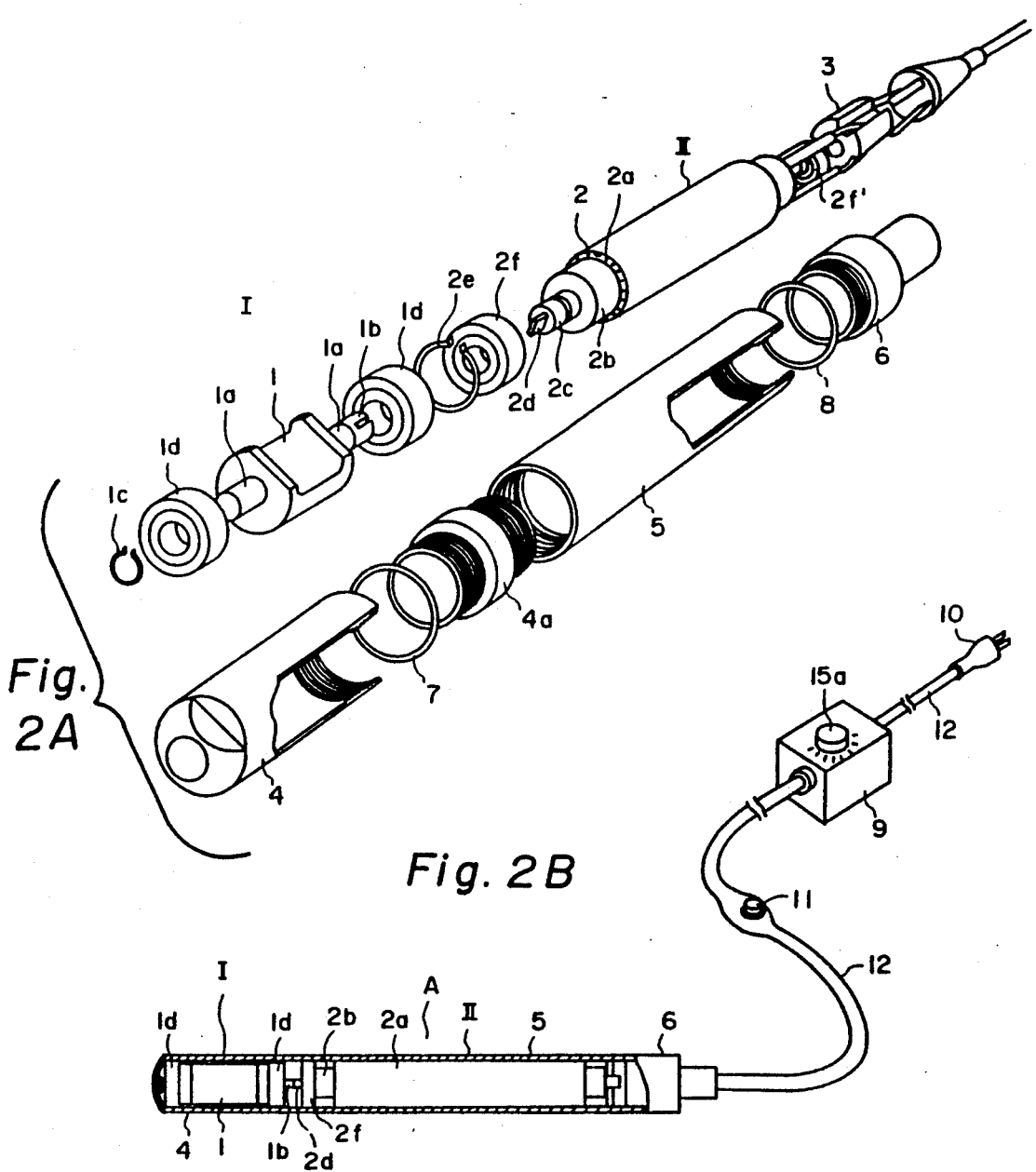

CONCRETE VIBRATOR

This is a continuation, of application Ser. No. 07/524,676, filed May 16, 1990. Now abandoned which is a continuation, of application Ser. No. 07/299,269, filed Jan. 23, 1989, now abandoned.

BACKGROUND OF THE INVENTION

The present invention relates to a concrete vibrator for deaeration.

A concrete vibrator for us in concrete placing comprises, for example, a vibrator body A composed of a vibrating section I with a built-in exciter and a drive motor section II and a driving circuit box B housing therein a start switch, etc. and connected to the vibrator body by means of a cable or a sleeve. The concrete vibrator for sufficient deaeration of concrete by vibrating it with the vibrator body A pressed thereinto makes the concrete high-density and is indispensable for constructing high strength concrete buildings.

Incidentally, the primary performance that is required of the concrete vibrator is as follows: (1) No appreciable lowering of the vibration frequency and consequently no substantial decrease in the workload when the vibrator body is pressed into concrete; (2) Variable setting of the vibration frequency with the hardness of concrete, for example, its water content, for the most efficient deaeration; (3) Small lightweight, simple, trouble-free and easily movable and operable structure by a small number of operators, for instance, one operator; and (4) No special power supply is needed, but operable from even a power supply of large voltage fluctuation. Almost all of these requirements are determined by characteristics of a motor for driving an exciter for vibration, for instance, an eccentric pendulum. A high-speed drive motor that has been widely employed as a driving source in the past, such as an induction motor or commutator motor, has advantages and disadvantages cannot meet all of the requirements (1) to (4).

For example, the induction motor as a drive source is simple-structured, sturdy and robust against overload and operable from an ordinary commercial power supply, but this motor has a slip, and hence varies its rotation speed with load fluctuations, inevitably causing a substantial change in the vibration frequency. For instance, when the vibrator is pushed into concrete after starting the induction motor in the air, its speed of rotation drops, for example, from 12 krpm to about 6 krpm. Therefore, the use of the induction motor has the disadvantages of consumption of much time for required deaeration, a marked reduction of the workload and the likelihood of insufficient deaeration. Such disadvantages are also occasioned according to the hardness of concrete. If a motor of a large capacity is employed with a view to avoiding such defects, then the concrete vibrator will become bulky, heavy and expensive.

According to a conventionally popular system which drives the induction motor at a high frequency, for example, at around 200 Hz through use of a frequency converter such as a motor generator static type inverter, the workload can be increased by increasing the vibration frequency on one hand, but, on the other hand, the use of the frequency converter makes the concrete vibrator costly and heavy. In addition, the high-frequency driving causes an increase in iron loss, leading to appreciable heat generation by both of the rotor and the stator. Accordingly, there is a fear of burning of the motor especially when the concrete vibrator is driven for a long time in the air where the load on the vibrator is small, or when it is used for deaeration for a long time; a thermal protector needs to be provided for thermal protection of the motor. This is another disadvantage. In addition, because of the induction motor, it is necessary to use a motor of a large capacity for avoiding the afore-mentioned defect which results from a slip. Such a motor is also large and heavy. Moreover, the rotation speed of conventional induction motors is fixed, and hence cannot be varied with the hardness of concrete, besides the use of an engine generator of large voltage fluctuations is disadvantageous because of the afore-mentioned defects peculiar to the induction motor, such as great restrictions on the power supply that can be used.

Recently there has been made an attempt to employ, as the driving source for the exciter, a semiconductor motor with a sensor, also called a DC brushless motor, in place of the induction motor. The so-called DC brushless motor comprises a permanent magnet type rotor, a stator and a semiconductor element circuit including a magnetosensitive element for sensing the rotational position of the permanent magnet rotor in place of the brush of a DC motor, such as a Hall element, and a transistor as a substitute for the commutator.

This motor possesses advantages in its characteristics over the induction motor in that it is small, high efficiency (10 to 20% higher), excellent in controllability such as constant speed control and variable speed control, and in start characteristic and easy of maintenance because of the no-brush structure; therefore, this motor is free from the afore-noted defects of the induction motor. In this motor, however, the Hall element for sensing the rotational position of the permanent magnet rotor, an encoder, an inductance, etc. are readily damaged by vibration of the vibrator and heat generation from the motor. Accordingly, this motor suffers frequent occurrences of troubles and involves cumbersome maintenance, resulting in low utilization efficiency. To avoid this, it has been proposed to separate the motor drive circuit from the vibrator body containing the motor, the Hall element and the exciter and interconnect them via a cable. With this method, however, the distance allowable between the vibrator body and the drive circuit is a maximum of only 1.5 meters or so due to restrictions such as a noise trouble. Therefore, this method is not suitable for application to the concrete vibrator which requires an about 20 meters long cable for movement of the vibrator body and, further, this method needs a thick cable containing around eleven control lines including a power line for the motor, causing inconvenience to movement of the vibrator body. Thus, the application of the semiconductor motor with a sensor to the concrete vibrator introduces new problems which have not been encountered in the prior art.

SUMMARY OF THE INVENTION

An object of the preset invention is to provide a concrete vibrator which is entirely free from the aforementioned various shortcomings of conventional concrete vibrators which employ, as the driving source, the induction motor, a high-speed motor such as a commutator motor, and the semiconductor motor with a sensor.

The present invention is characterized by the use of a sensorless semiconductor motor for driving the exciter. The sensorless semiconductor motor has an arrangement in which the rotational position of the permanent magnet rotor is sensed through utilization of a voltage which is induced from three-phase stator windings, i.e. a voltage which is induced according to the magnetic flux distribution in the gap and varies its frequency with the rotation speed alone instead of by using the Hall element which is readily damaged by vibration and heat, that is, seriously poor in environmental resistance. Further, the sensorless semiconductor motor is arranged so that the current supply to the stator winding is placed under control of a semiconductor inverter which is controlled by a PWM or PAM system.

BRIEF DESCRIPTION OF THE DRAWINGS

The present invention will be described in detail below in comparison with prior art with reference to the accompanying drawings, in which:

FIGS. 2A and 2B show an exploded perspective view of the vibrator body illustrating an embodiment of the present invention and a partially sectional view showing its overall structure;

DETAILED DESCRIPTION

To make differences between the present invention and prior art clear, examples of prior art will first be described.

Figures 1A, 1B:
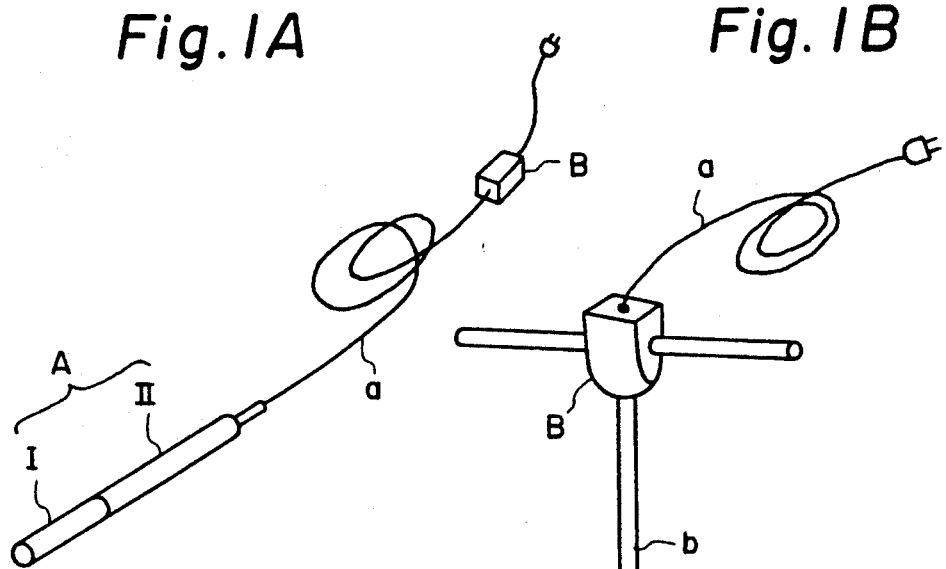
FIGS. 1a and 1b show a schematic diagram showing the construction of a concrete vibrator.

A concrete vibrator for use in concrete placing comprises, for example, as shown in FIGS. 1A and 1B, a vibrator body A composed of a vibrating portion I with a built-in exciter and a drive motor position II and a driving circuit box B housing therein a start switch, etc. and connected to the vibrator body by means of a cable a or a sleeve b. The concrete vibrator for sufficient deaeration of concrete by vibrating it with the vibrator body A pressed thereinto makes the concrete high-density and is indispensable for constructing high strength concrete buildings.

The above examples of prior art have the previously mentioned defects.

Next, the present invention will be described in detail with regard to an embodiment.

Figure 3:
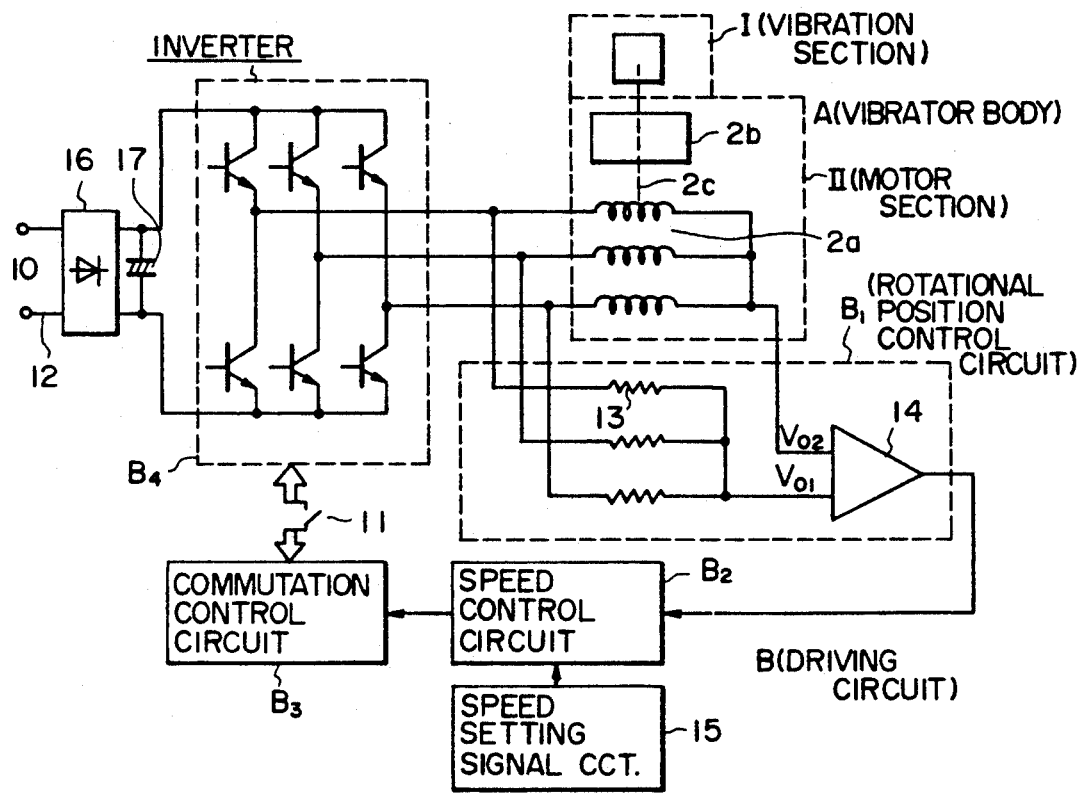
FIG. 3 is its electric circuit diagram.

FIGS. 2A and 2B are an exploded perspective view and a sectional view of the vibrator body illustrating an embodiment of the present invention, and FIG. 3 a circuit diagram showing its motor and a motor control circuit.

In FIG. 2A reference numeral I indicates a vibration section, 1 an eccentric pendulum, 1a its shaft, 1b a coupling, 1c a snap ring, and 1d bearings which need to be larger than the outer diameter of the eccentric pendulum 1 and stand a long-term use. Reference numeral II designates a motor section, 2 a stator core, 2a a stator winding, 2b a permanent magnet rotor, 2c its rotary shaft, and 2d a coupling for engagement with the coupling 1b of the eccentric pendulum 1. Reference numeral 2e identifies a snap ring, 2f and 2f bearings for bearing the rotary shaft 2c, and 3 a terminal member for interconnecting the stator winding 2a and a driving section described later via a cable.

Reference numeral 4 designates a vibrating tube, which is made of a material of high wear resistance. Reference numeral 5 denotes a motor case and 6 a terminal case. The vibrating tube 4 and the motor case 5 are threadably engaged with each other through a watertight O ring 7 and a joint case 4a. The motor case 5 and the terminal case 6 are threadably engaged with each other through a watertight O ring 8. The vibration section I and the motor section II are housed in the vibrating tube and the motor case, constituting the vibrator body A as shown in FIG. 2B. In FIG. 2B reference numeral 9 indicates a driving circuit box, in which a rotational position control circuit $B_1$, an inverter $B_4$ and so on formed as a semiconductor chip described later are housed. Reference numeral 10 designates a plug for power source connection and 11 a start-stop pushbutton, which is provided on a cable 12 near the vibrator body A.

In FIG. 3, reference numerals I and II indicate the vibration section and the motor section forming the vibrator body A. In the motor section II reference numeral 2b a permanent magnet rotor, 2c its rotary shaft, and 2a a star-connected three-phase stator winding. Reference character B identifies a driving circuit and $B_1$ a rotational position control circuit of the permanent magnet rotor, which circuit is composed of star-connected resistors 13 connected in parallel to the three-phase stator windings 2a and a differential amplifier 14 which is supplied with a neutral-point voltage $V_{01}$ of the resistors and a neutral-point voltage $V_{02}$ of the star-connected three-phase stator windings 2a. Reference character $B_2$ denotes a speed control circuit, which has a speed setting signal circuit 15 and delivers an output of comparison between a signal set in the signal circuit 15 and a signal detected by the differential amplifier 14. Reference character $B_3$ identifies a commutation control circuit for providing a pulse modulation output, $B_4$ a full-wave semiconductor inverter, which is controlled in the position of commutation by the commutation control circuit $B_3$, 16 a rectifier circuit, and 17 a smoothing capacitor. The driving circuit composed of the above-mentioned circuit elements is housed in the driving circuit box 9 shown in FIG. 2B, with a control knob 15a of the variable speed-setting signal circuit 15 of the speed control circuit $B_2$ disposed on the outside of the box 9. The driving circuit is connected to the commercial power line through the cable 12 and the plug 10. The start-stop pushbutton 11 is, for example, of the type that is turned ON when pressed and is turned OFF when pressed next. This switch is connected to, for instance, a base signal circuit of the inverter $B_4$ of a small current value so as to actuate the switch with a small amount of current and make it so small that it can be buried in the cable 12 near the vibrator body A as depicted in FIG. 2B. Next, a description will be given of the operation of the concrete vibrator of the present invention which has the above-noted arrangement.

The AC voltage from the power supply is converted by the rectifier circuit 16 into a DC voltage, which is then converted by the inverter $B_4$ into AC voltages of a preset required frequency. It is well-known in the art that voltages induced in the star-connected three-phase stator windings 2a supplied with such voltages are composed of the fundamental waves and harmonic waves dependent on the magnetic flux distribution in the gap, mainly third harmonics. The fundamental waves are successively spaced by an angular distance of 120 degrees, and hence will not appear at the neutral point of the three-phase stator windings 2a, but only a voltage which is in-phase with the fundamental wave and has a frequency three times higher than that of the fundamental wave, that is, a third harmonic wave voltage $V_{02}$ whose period varies in synchronism with the rotation speed of the motor, can be obtained at the above-mentioned neutral point. Therefore, if voltages of the respective phases are in equilibrium, then no fundamental wave component voltage will appear at the neutral point. If the power supply voltage is composed substantially only of the fundamental components, then the potential at the neutral point will always be held at zero. By using the neutral point potential $V_{01}$ of the star-connected three-phase resistors 13 as a reference level and detecting a difference between it and the neutral point potential $V_{02}$ of the three-phase stator windings 2a, it is possible to obtain the third harmonic voltage components which are synchronized with the rotation of the permanent magnet rotor and whose cycle period varies in proportion to the rotation speed of the motor. It is therefore possible to electrically sense the position of rotation of the permanent magnet rotor at a distance from the vibrator body A without the need of employing the afore-mentioned Hall element or the like which has markedly low environmental resistance in that it is easily damaged by vibration and heat generation from the motor.

In other words, each speed setting reference pulses from the speed setting circuit 15 and pulses corresponding to the cycle period of the third harmonic voltage components, provided from the rotation position sensor $B_1$, are compared with each other by the speed control circuit $B_2$, and the inverter $B_4$ is controlled by feeding back thereto a pulsewidth modulated output via the commutation control circuit $B_3$ to control the current supply to the stator windings 2a so that the period error signal detected by the speed control circuit $B_2$ is always reduced to zero. In this way, the rotation speed of the motor is always controlled to follow the set value. In addition, since the setting of the rotation speed is variable, a desired speed and a desired vibration frequency can freely be obtained as required.

Figure 4:
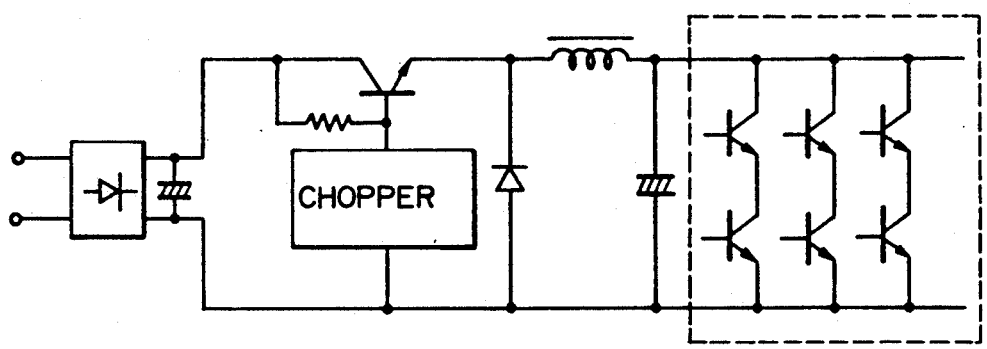
FIG. 4 is a diagram explanatory of another commutation control system.

In the above embodiment the pulse width modulation system, commonly referred to as a PWM control system is employed for commutation control of the inverter, but it is also possible to use a chopper control type inverter, i.e. a so-called PAM inverter shown in FIG. 4, for instance. This is well-known in the art, and hence will not be described in particular. Although the above embodiment has been described to employ the semiconductor motor adapted for sensing the rotational position of the permanent magnet rotor by the third harmonic wave voltage which is induced in the stator winding, it is also possible to employ a semiconductor motor which utilizes, for sensing the rotational position of the permanent magnet rotor, back electromotive force of a driving power source frequency which is induced in each stator winding.

As described above, the present invention drives the vibrator by the semiconductor motor which senses the position of rotation of the permanent magnet rotor through utilization of the voltage induced in the stator winding, and accordingly, overcomes all of the afore-mentioned disadvantages of the conventional vibrators and produces excellent effects which substantially fully satisfy the performance required of the concrete vibrator.

That is, (1) since the function of the brush of the DC motor is performed by using the voltage induced in the stator winding for sensing the position of the permanent magnet rotor, there is no need of employing the Hall element or the like which is easily damaged by vibration and heat generated by the motor, that is, considerably low in the environmental resistance.

(2) Since the induced voltage is used for the position sensing, the vibrator body and the driving circuit box can be spaced more than a required distance (for example, 20 meters, as mentioned previously). In addition, conductors of the cable interconnecting the driving circuit box and the vibrator body are three to four conductors for the stator windings, and accordingly, the cable need not be made thick, so that the vibrator of the present invention is free from the defects of the conventional vibrator using the semiconductor motor with a sensor.

(3) Since an arbitrary fixed vibration frequency can be obtained by changing the setting of the reference signal period of the speed setting circuit, it is possible not only to apply optimum vibration to concrete in accordance with its hardness but also to keep the rotation speed of the motor constant regardless of power supply voltage fluctuations. The concrete vibrator of the present invention, then, can be used with the commercial power line and an engine generator, and accordingly, it is not subject to any limitations on the power supply used. In addition, since the rotation speed of the motor is controlled to be constant, there is no possibility of lowering of the vibration frequency by a slip as experienced in the conventional induction motor and the workload will not be decreased as a result. Besides, since there is no need of employing a motor of a large capacity so as to prevent the lowering of the vibration frequency by a slip as in the case of the induction motor, the vibrator can be made small and lightweight accordingly; this offers a solution to the problem of aging of construction workers which has become conspicuous in recent years.

(4) Since an exclusive high-frequency power supply, for example, a motor generator is not needed, the vibrator of the present invention is simple-structured and inexpensive accordingly.

(5) The rotor is a permanent magnet, and hence does not produce heat, and the stator which generates heat is disposed outside the rotor and can easily be cooled.

(6) The semiconductor motor has an efficiency 10 to 20% higher than the induction motor, and hence smaller in size, weight and power dissipation accordingly.

(7) The start-stop pushbutton switch can be provided in a small current circuit, for example, the base signal circuit of the inverter $B_4$ shown in FIG. 3, and hence is small. Then a reed switch or snap switch can be buried in the cable near the vibrator. Since the switch can be made watertight, there is no fear of breakage of the switch or a danger of the operator getting an electric shock. Moreover, since the switch can be provided near the vibrator, the vibrator can be inserted into concrete and started by only one person and the vibrator can also remote-controlled; this increases the degree of freedom in operation.

(8) The vibrator of the present invention is smaller and lighter than the conventional vibrator using the induction motor and can be transported by one person, and hence can be moved on the same floor at a construction site such as a building, with more ease than in the part. Thus, the vibrator of the present invention meets every requirement for higher performance demanded in the past.

What we claim is:

1. A concrete vibrator comprising, a motor, an eccentric pendulum, driven by the motor for effectively reducing a drop in speed of rotation of the eccentric pendulum upon immersion into a fresh concrete mass, a cable for supplying electric power to said motor, said motor having a permanent magnet rotor and three-phase stator windings, a driving circuit disposed remote from said motor and pendulum provided in the cable to drive the motor by electric power and comprising components in the cable remote from the motor and pendulum sufficiently to preclude vibrations of the vibrator affecting said components, said driven circuit components comprising, a frequency changer of a semiconductor inverter coupled to said motor, a differential amplifier, a variable speed setting circuit for generating reference pulses, a speed control circuit and a commutation control circuit connected for controlling the frequency changer to control a vibration frequency of the concrete vibrator with pulse-modulated commutation signals, a start-stop switch disposed in said cable near to the motor and pendulum connected to the inverter and the commutation control circuit for starting and stopping the vibrator, and a neutral point of the stator windings effective to feed a neutral point potential as an input to the differential amplifier;

the neutral point potential occurring at an artificial neutral point at a stator winding input being fed as another input of the differential amplifier so that a detected voltage is obtained at an output of the differential amplifier as third harmonic voltage components of the three-phase stator windings, the differential amplifier being connected so that the detected voltage is compared with the reference pulses in the speed control circuit to obtain an error signal for influencing the degree of modulation of the pulse-modulated commutation signals at the commutation control circuit to reduce said error signal to zero.

2. A concrete vibrator according to claim 1, including a switch for ON-OFF switching of the pulse-modulated commutation signals from the commutation control circuit to the frequency changer.

3. A concrete vibrator according to claim 1, in which the frequency changer has an intermediate circuit and a semiconductor positioner in said intermediate circuit.

4. A concrete vibrator according to claim 1, in which said commutation control circuit comprises means forming pulse width modulation signals as the pulse modulated commutation signals.

5. A concrete vibrator according to claim 1, in which said commutation control circuit comprises means forming pulse amplitude signals as the pulse-modulated commutation signals.

* * * * *